(12) United States Patent
Matsuo et al.

(10) Patent No.: US 11,573,417 B2
(45) Date of Patent: Feb. 7, 2023

(54) OPTICAL SCANNING DEVICE AND IMAGE FORMING APPARATUS

(71) Applicant: SHARP KABUSHIKI KAISHA, Sakai (JP)

(72) Inventors: Manabu Matsuo, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 253 days.

(21) Appl. No.: 17/109,730

(22) Filed: Dec. 2, 2020

(65) Prior Publication Data
US 2021/0173202 A1 Jun. 10, 2021

(30) Foreign Application Priority Data
Dec. 10, 2019 (JP) .............................. JP2019-223125

(51) Int. Cl.
*G02B 26/12* (2006.01)
(52) U.S. Cl.
CPC ......... *G02B 26/123* (2013.01); *G02B 26/125* (2013.01); *G02B 26/127* (2013.01)
(58) Field of Classification Search
None
See application file for complete search history.

(56) References Cited

U.S. PATENT DOCUMENTS

| 7,253,935 B2 * | 8/2007 | Kobayashi | ......... G03G 15/5058 |
| | | | 347/243 |
| 8,872,873 B2 * | 10/2014 | Jin | ..................... G02B 26/0825 |
| | | | 347/242 |
| 9,141,025 B1 * | 9/2015 | Tomioka | .............. G02B 26/121 |

FOREIGN PATENT DOCUMENTS

JP 2017-227739 A 12/2017

* cited by examiner

*Primary Examiner* — Jennifer D. Carruth
(74) *Attorney, Agent, or Firm* — ScienBiziP, P.C.

(57) ABSTRACT

An optical scanning device includes a light source, a beam detector that takes a main scanning start time of a light beam emitted from the light source and deflection-scanned in a predetermined main scanning direction by a deflection-scanning component, and a housing with a support portion that supports reflecting mirrors in different arrangement positions so arrangement angles are different from each other. The support portion includes a first support portion that supports a first side surface of the reflecting mirror in a plurality of arrangement positions. A second support portion supports the first side surface of the mirror with the first support portion, causing a first arrangement angle in the first arrangement position of the reflecting mirror. A third support portion supports the first side surface of the reflecting mirror with the first support portion, causing a second arrangement angle in a second arrangement position of the reflecting mirror.

15 Claims, 17 Drawing Sheets

OPTICAL SCANNING DEVICE AND IMAGE FORMING APPARATUS

BACKGROUND OF THE INVENTION

Field of the Invention

The present invention relates to an optical scanning device and an image forming apparatus such as a copy machine, a multifunction peripheral, a printer, or a facsimile machine.

Description of the Background Art

Generally, in optical scanning devices, to take a main scanning start time of an light beam emitted from a light source (for example, a laser diode element) and deflection-scanned by a deflection-scanning component (for example, a rotary polygon mirror) in a predetermined main scanning direction, the optical scanning device receives, by using a beam detector, the light beam at a time before the start of the main scan, and outputs a beam detection signal from the beam detector indicating the time before the start of the main scan. (For example, Japanese Patent Application Publication No. 2017-227739)

Also, it is conceivable that a portion of the optical system components for deflection-scanning the light beam in the optical scanning device be commonly used in each model of an electronic device (for example, each model of an image forming apparatus) included in the optical scanning device. In reality, however, some of the optical system components cannot be commonly used in each model.

Therefore, an object of the present invention is to provide an optical scanning device and an image forming apparatus capable of commonly using, in each model, a portion of the optical system components for deflection-scanning a light beam.

SUMMARY OF THE INVENTION

In order to solve the above problems, the optical scanning device according to the present invention includes a light source; a beam detector that takes a main scanning start time of a light beam emitted from the light source and deflection-scanned in a predetermined main scanning direction by a deflection-scanning component; and a housing provided with a support portion that supports a reflecting mirror reflecting the light beam in a plurality of different arrangement positions so the arrangement angles are different from each other. The support portion includes a first support portion, a second support portion, and a third support portion. The first support portion commonly supports one first side surface in the plurality of arrangement positions in a thickness direction of a reflecting mirror. The second support portion supports the first side surface of the reflecting mirror together with the first support portion, causing a first arrangement angle in a first arrangement position of the reflecting mirror. The third support portion supports the first side surface together with the first support portion, causing a second arrangement angle in a second arrangement position of the reflecting mirror. Further, the image forming apparatus according to the present invention includes the optical scanning device of the present invention.

According to the present invention, it is possible to commonly use, in each model, a portion of the optical system components for deflection-scanning a light beam.

DESCRIPTION OF THE PREFERRED EMBODIMENTS

Figure 1:
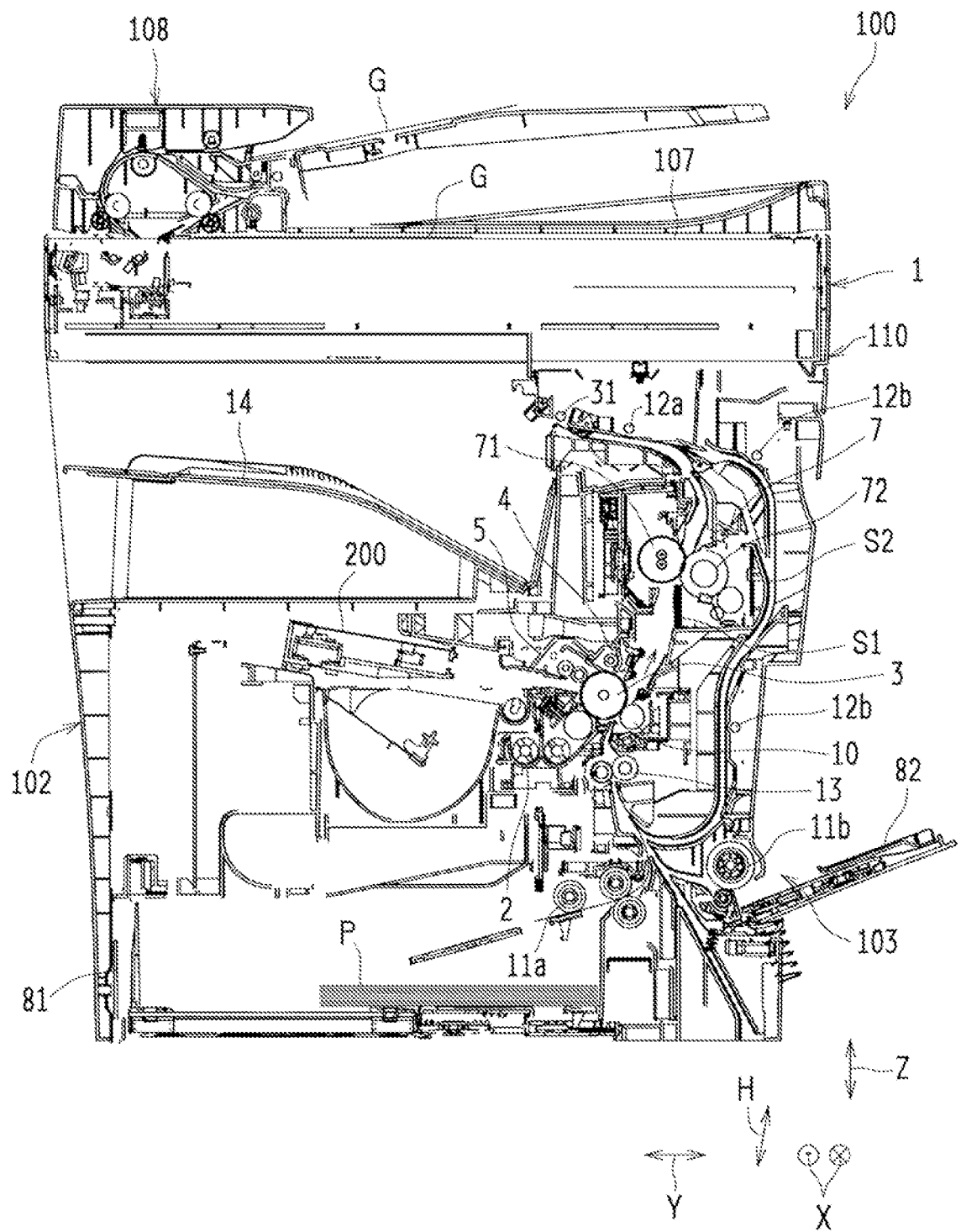
FIG. 1 is a schematic cross-sectional view of an image forming apparatus according to the present embodiment as viewed from the front.

Hereinafter, embodiments according to the present invention will be described with reference to the drawings. In the following description, the same parts are designated by the same reference numerals. The names and functions of these parts are the same. Therefore, the detailed description of these parts will not be repeated.

Image Forming Apparatus

FIG. 1 is a schematic cross-sectional view of an image forming apparatus 100 according to the present embodiment as viewed from the front. In FIG. 1, reference numeral X represents a depth direction, reference numeral Y represents a left and a right direction (width direction), and reference numeral Z represents an up and a down direction (height direction).

The image forming apparatus 100 according to the present embodiment is a monochrome image forming apparatus. The image forming apparatus 100 performs an image forming process according to image data read by the image reading device 1 or image data transmitted from outside. It is noted that the image forming apparatus 100 may also be a color image forming apparatus that forms multicolor and monochromatic images on the paper P.

The image forming apparatus 100 includes a document feeder 108 and an image forming apparatus main body 110. The image forming apparatus main body 110 is provided with an image forming section 102 and a paper conveying system 103.

The image forming section 102 includes an optical scanning device 200 (optical scanning unit), a developing unit 2, a photoreceptor drum 3 that acts as an electrostatic latent image carrier, a cleaning unit 4, a charging device 5, and a fixing unit 7. Further, the paper conveying system 103 includes a paper feed tray 81, a manual paper feed tray 82, a discharge roller 31, and a discharge tray 14.

An image reading device 1 for reading an image of the document G is provided on the upper part of the image forming apparatus main body 110. The image reading device 1 includes a document placing table 107 on which the document G is placed. Further, a document feeder 108 is provided on the upper side of the document placing table 107. In the image forming apparatus 100, the image of the document G read by the image reading device 1 is sent to the image forming apparatus main body 110 as image data, and the image is recorded on the paper P.

The image forming apparatus main body 110 is provided with a paper conveyance path S1. The paper feed tray 81 or the manual paper feed tray 82 supplies the paper P to the paper conveyance path S1. The paper conveyance path S1 guides the paper P to the discharge tray 14 via the transfer roller 10 and the fixing unit 7. The fixing unit 7 heats and fixes the toner image formed on the paper P onto the paper P. Pickup rollers 11a and 11b, conveyance roller 12a, registration roller 13, transfer roller 10, heat roller 71, pressure roller 72 in the fixing unit 7, and discharge roller 31 are arranged in the vicinity of the paper conveyance path S1.

In the image forming apparatus 100, the paper P supplied by the paper feed tray 81 or the manual paper feed tray 82 is conveyed to the registration roller 13. Next, the paper P is conveyed to the transfer roller 10 by the registration roller 13 at a time at which the paper P is aligned with the toner image on the photoreceptor drum 3. The toner image on the photoreceptor drum 3 is transferred onto the paper P by the transfer roller 10. After that, the paper P passes through the heat roller 71 and the pressure roller 72 in the fixing unit 7 and is discharged onto the discharge tray 14 via the conveyance roller 12a and the discharge roller 31. When an image is formed not only on the front surface of the paper P but also on the back surface, the paper P is conveyed from the discharge roller 31 to the reverse paper conveyance path S2 in the opposite direction. The front and back of the paper P are reversed and the paper P is again guided to the registration roller 13 via the reverse transfer rollers 12b-12b. Then, after a toner image is formed and fixed on the back surface in the same manner as on the front surface, the paper P is discharged toward the discharge tray 14.

Optical Scanning Device

Figure 2:
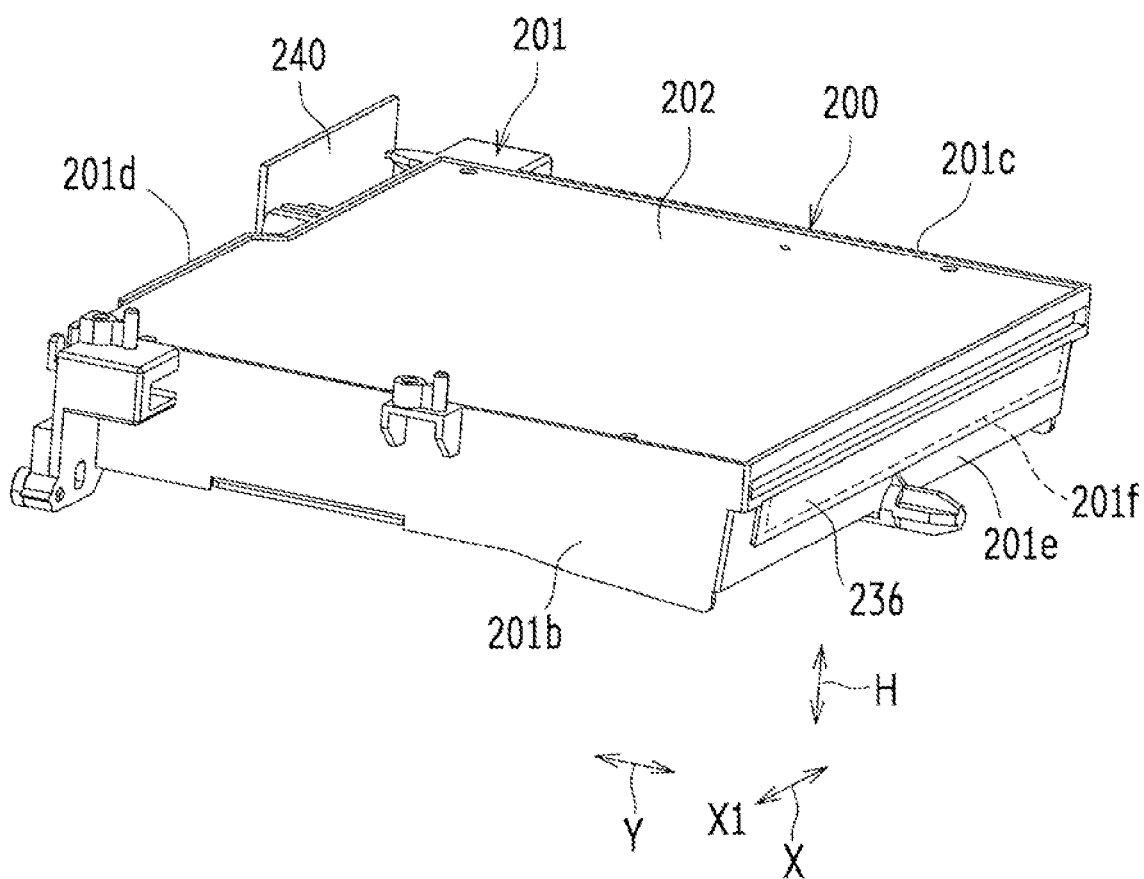
FIG. 2 is a perspective view of the front side of the optical scanning device of the image forming apparatus as viewed from the upper left of the illustration in FIG. 1.
Figure 3:
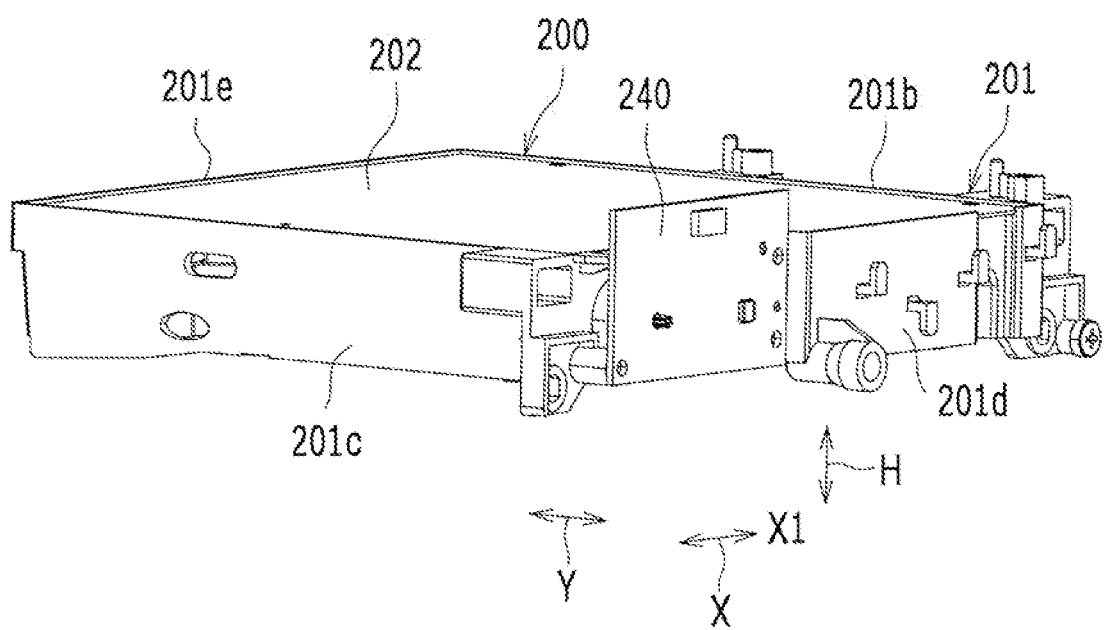
FIG. 3 is a perspective view of the back side of the optical scanning device illustrated in FIG. 2 as viewed from the upper left.
Figure 4:
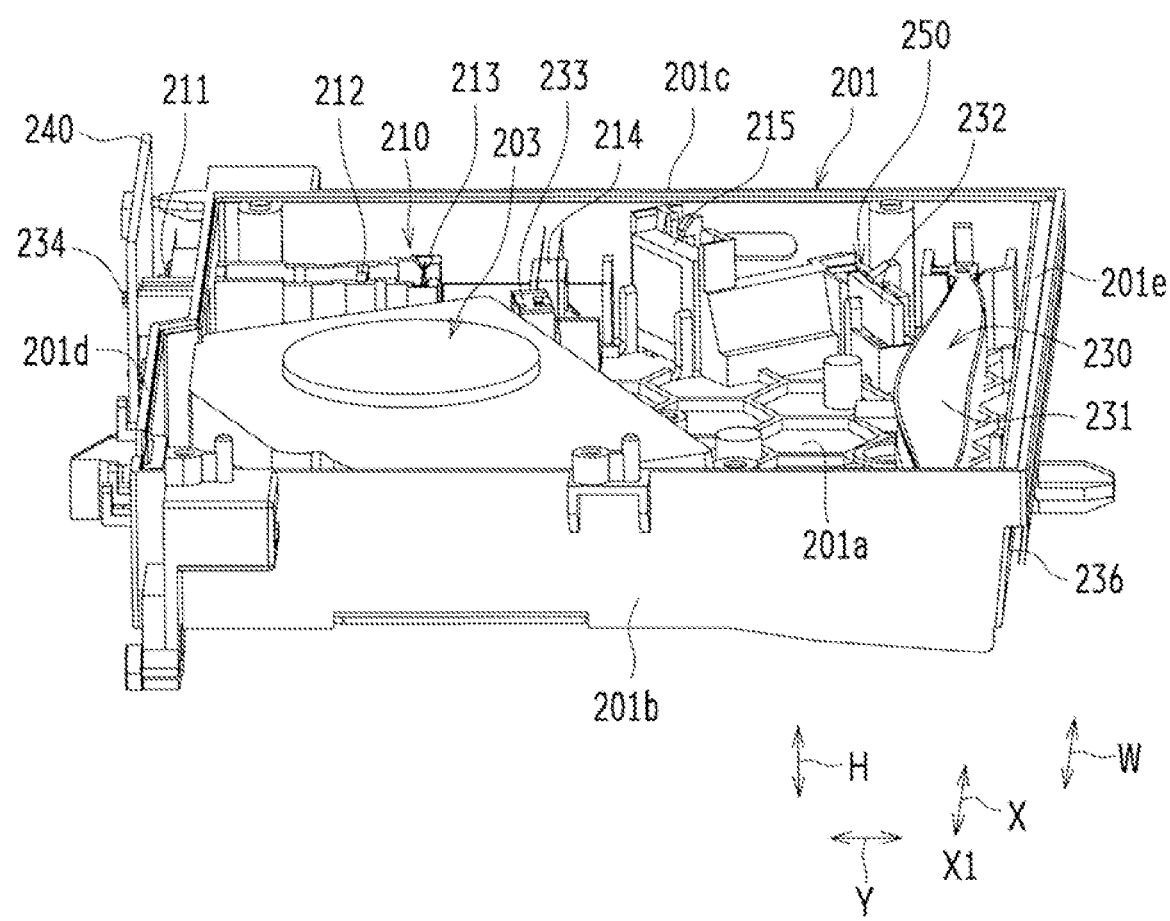
FIG. 4 is a perspective view of the optical scanning device illustrated in FIG. 2, in which the upper lid is removed, and viewed from above on the front side.
Figure 5:
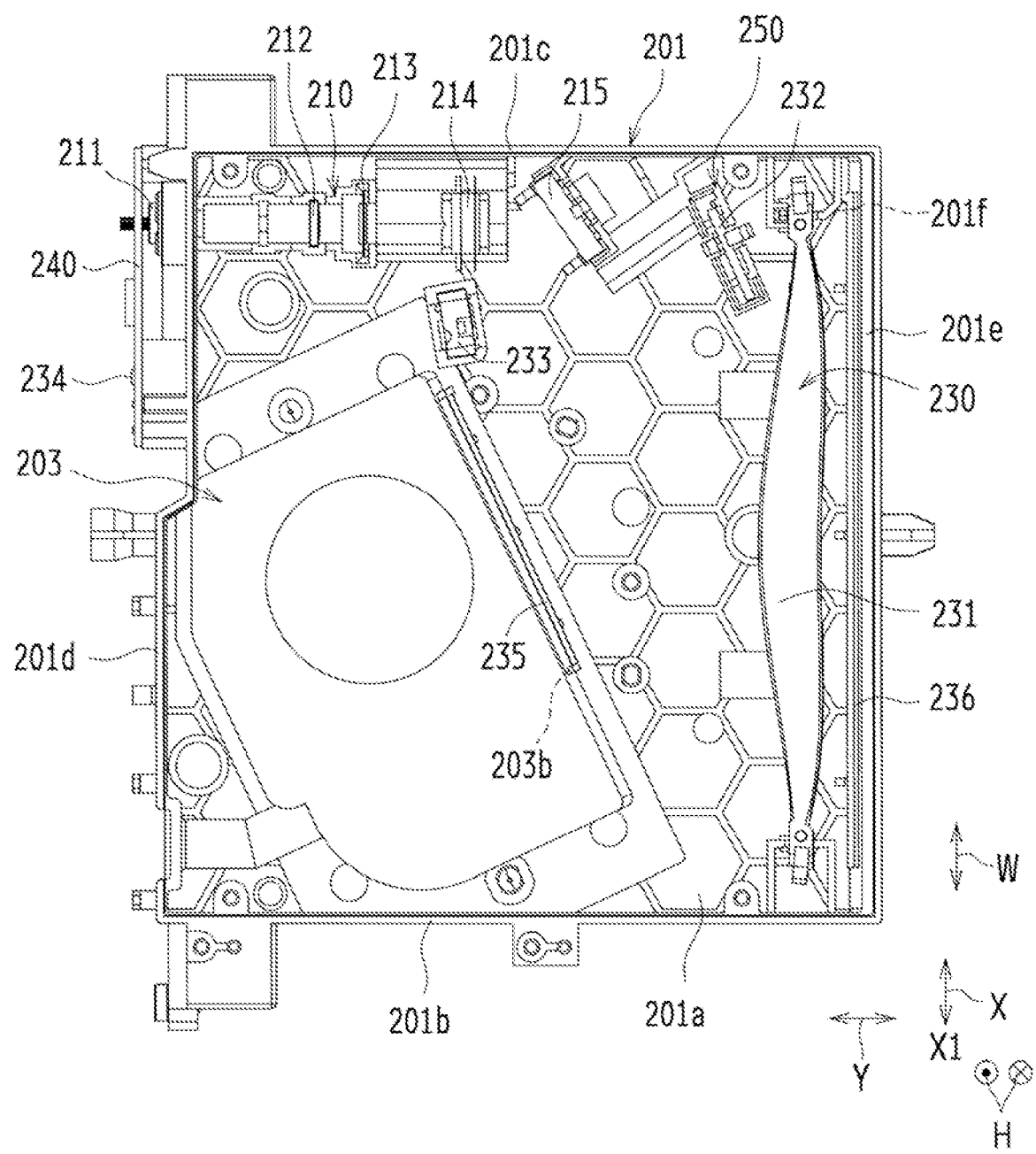
FIG. 5 is a plan view of the optical scanning device illustrated in FIG. 4.
Figure 6:
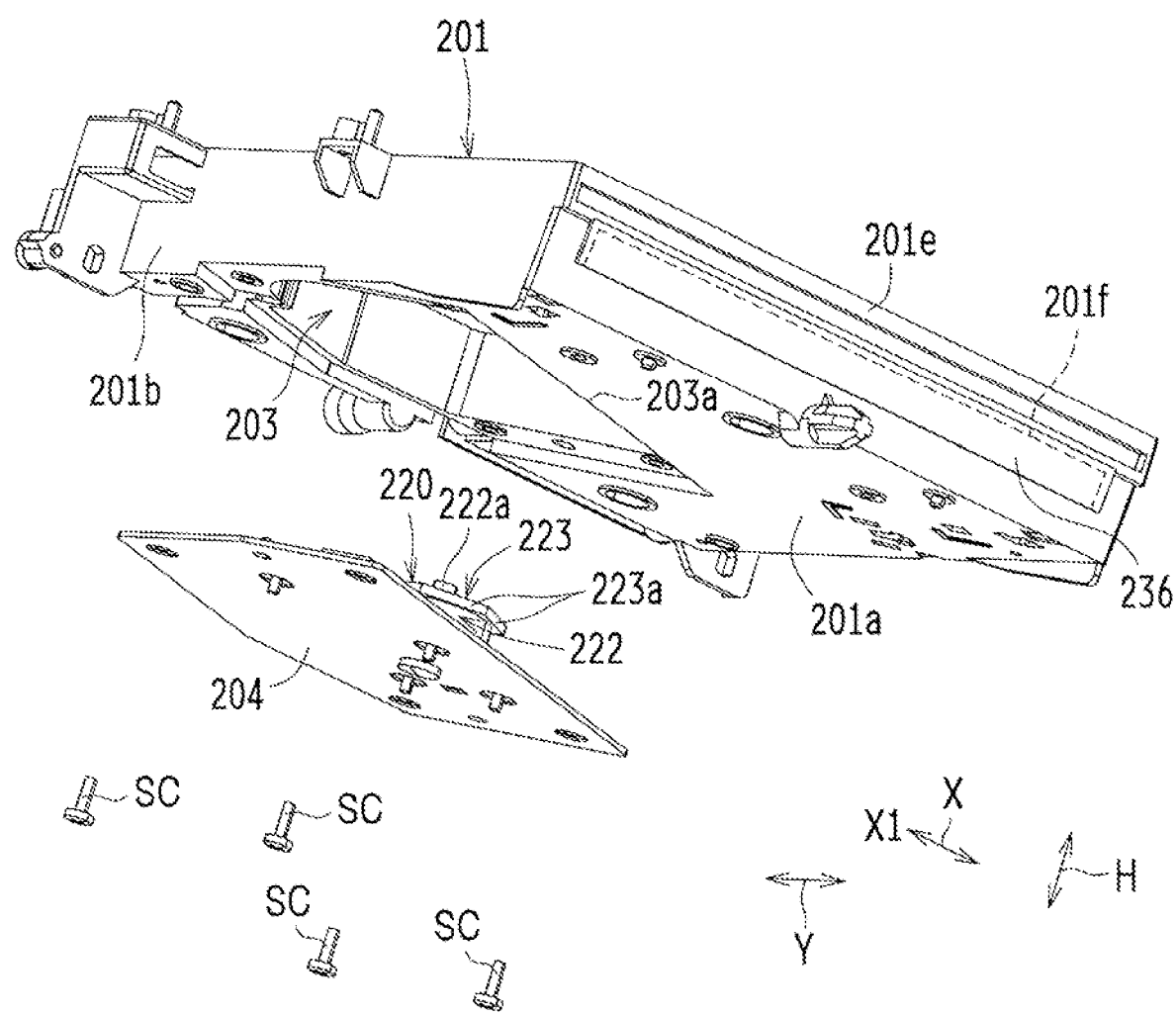
FIG. 6 is an exploded perspective view illustrating a state in which the lower lid of the optical scanning device is removed.
Figure 7A:
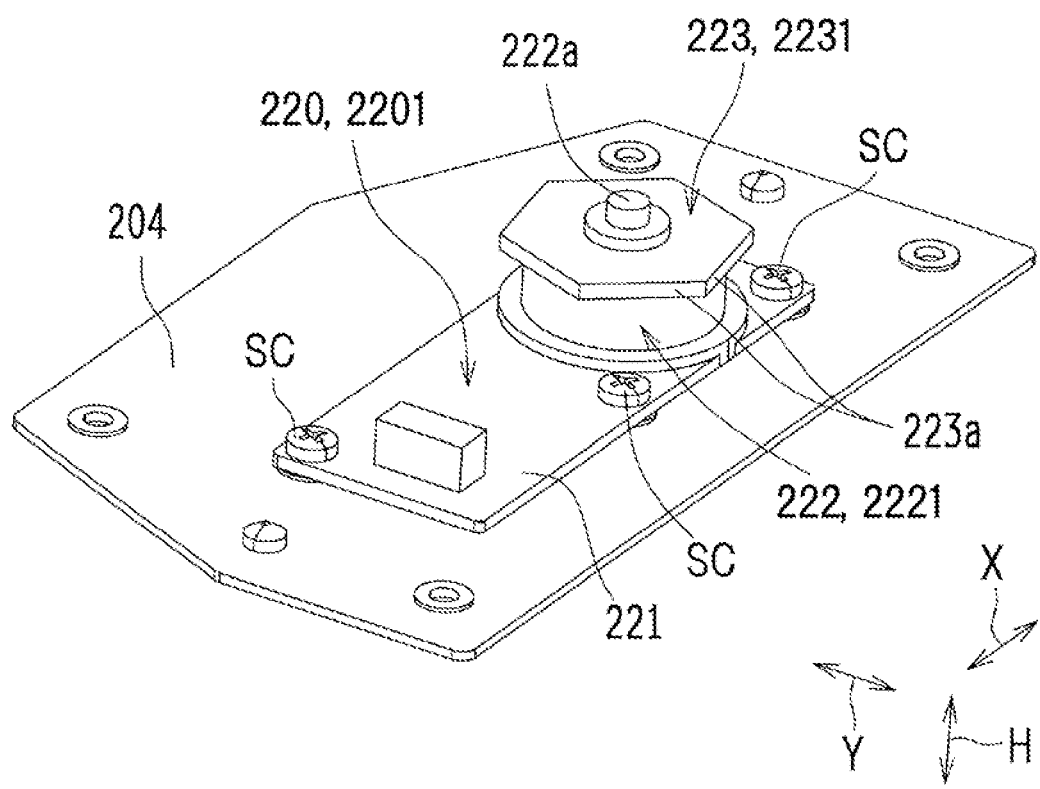
FIG. 7A is a perspective view illustrating an example of a deflection-scanning unit in an optical scanning device.
Figure 7B:
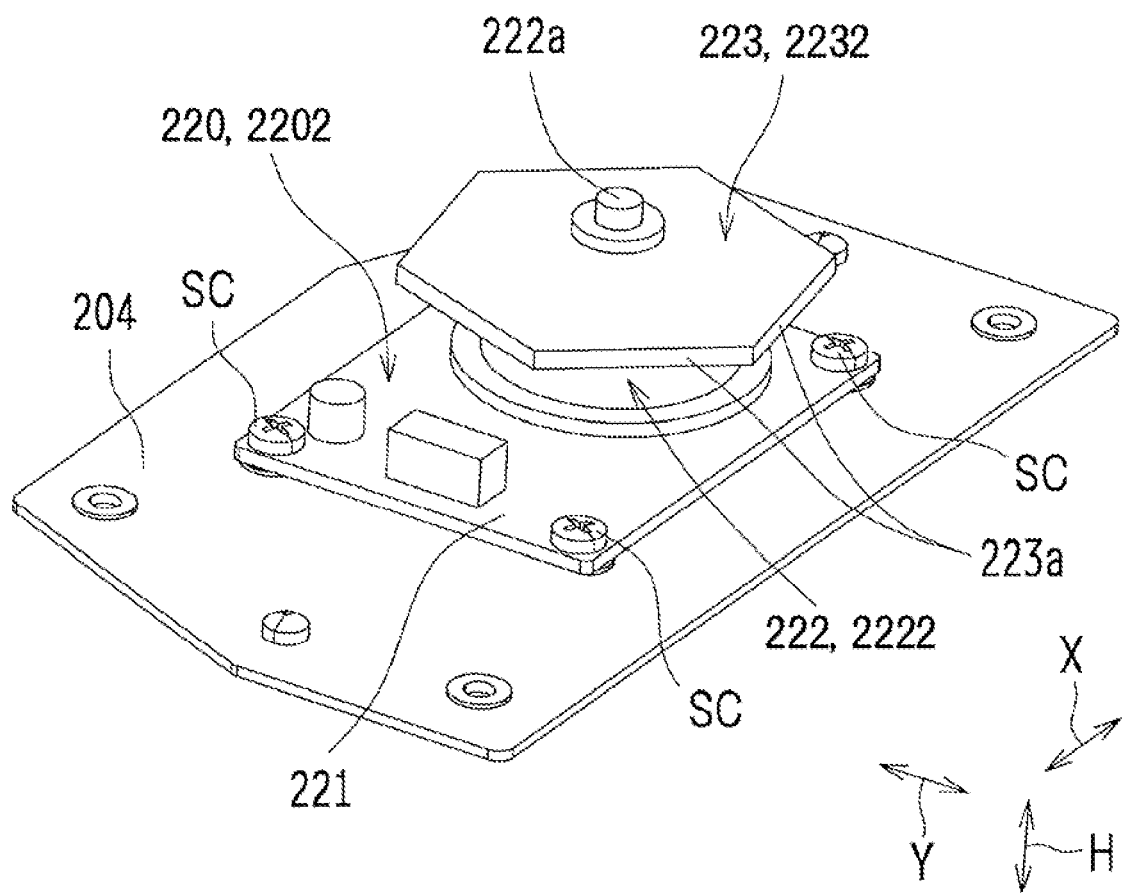
FIG. 7B is a perspective view illustrating another example of a deflection-scanning unit in an optical scanning device.
Figure 8A:
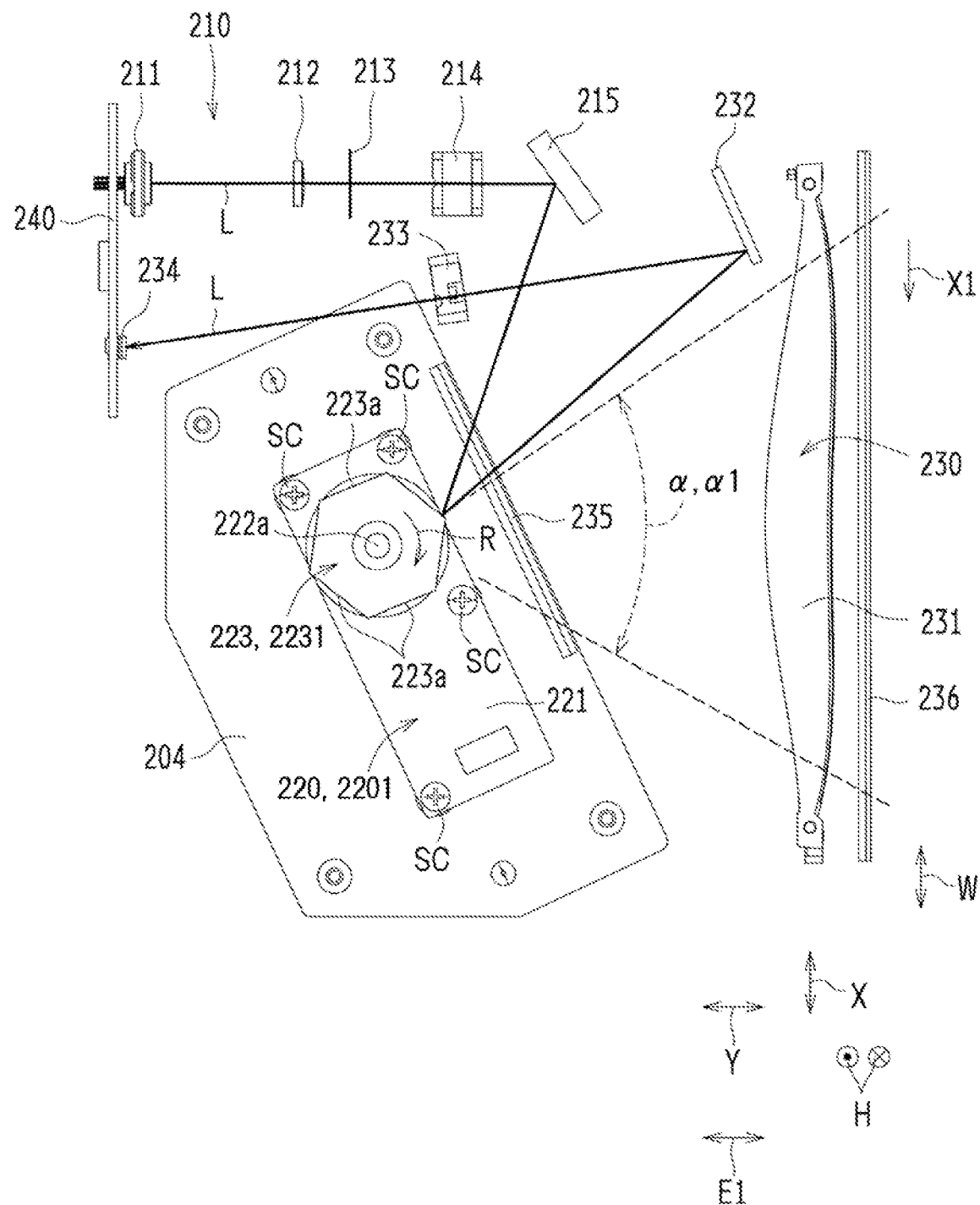
FIG. 8A is a plan view illustrating an example of a configuration of an optical system in an optical scanning device.
Figure 8B:
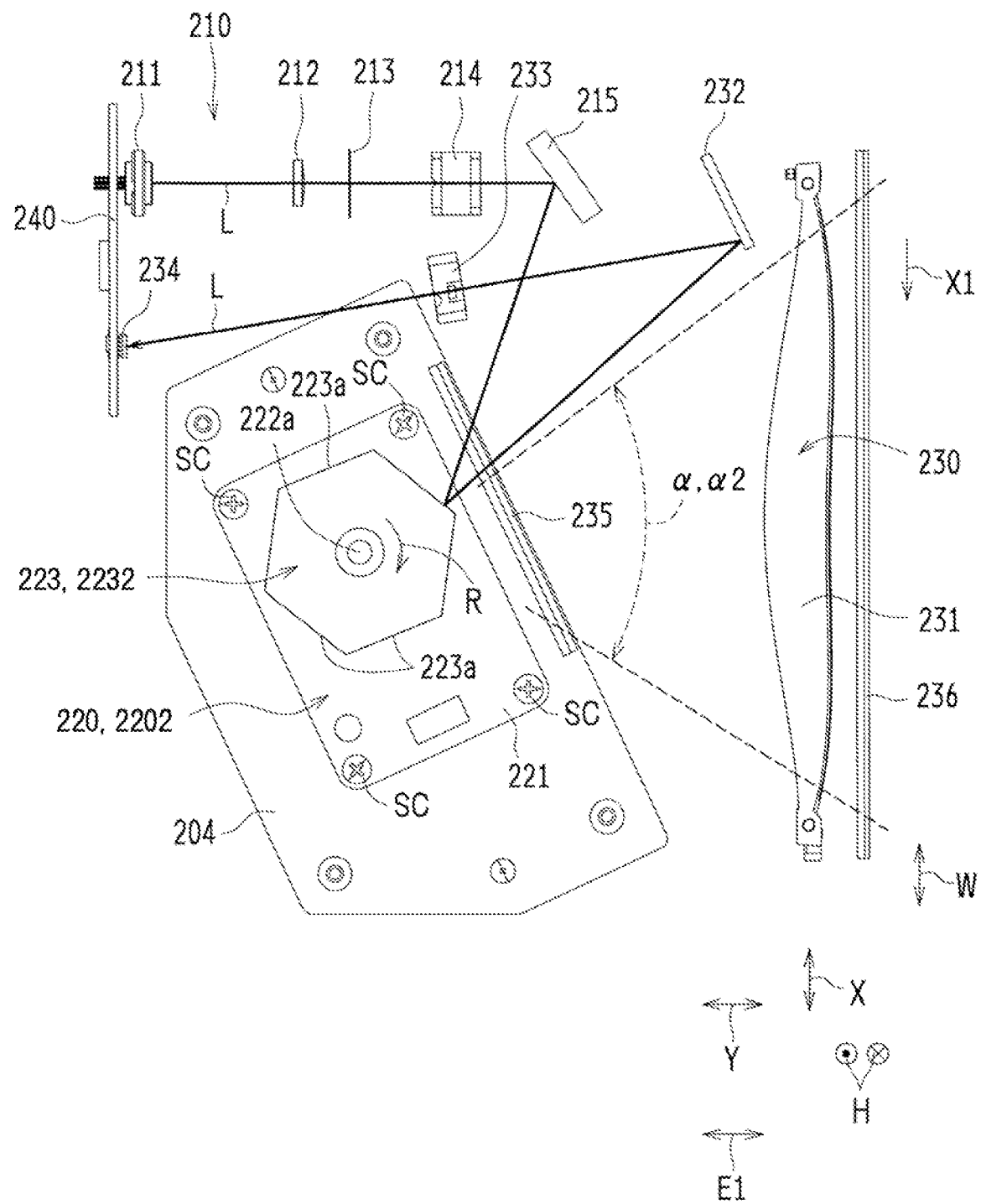
FIG. 8B is a plan view illustrating another example of a configuration of an optical system in an optical scanning device.
Figure 9:
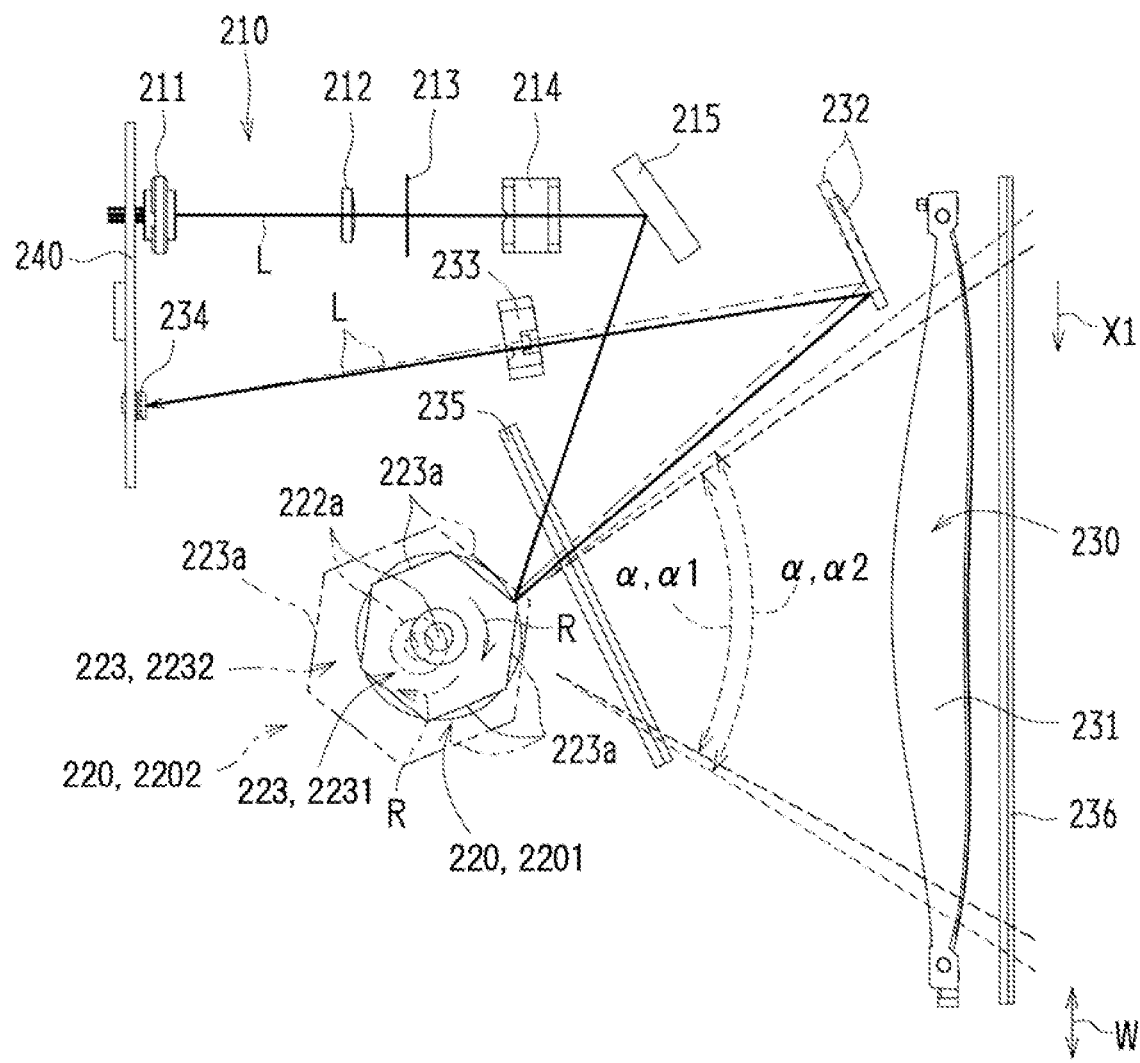
FIG. 9 is a plan view of the example and the other example of the configuration of the optical system in the optical scanning device illustrated in FIGS. 8A and 8B.

FIG. 2 is a perspective view of the front side of the optical scanning device 200 in the image forming apparatus 100 illustrated in FIG. 1 as viewed from the upper right. FIG. 3 is a perspective view of the back side of the optical scanning device 200 as viewed from the upper left of the illustration in FIG. 1. FIG. 4 is a perspective view of the optical scanning device 200 illustrated in FIG. 2, in which the upper lid 202 is removed, as viewed from above on the front side. FIG. 5 is a plan view of the optical scanning device 200 illustrated in FIG. 4. FIG. 6 is an exploded perspective view illustrating a state in which the lower lid 204 of the optical scanning device 200 is removed. FIGS. 7A and 7B are perspective views, each illustrating an example of the deflection-scanning unit 220 in the optical scanning device 200. FIGS. 8A and 8B are plan views, each illustrating an example of the configuration of the optical system in the optical scanning device 200. FIG. 9 is a plan view of the example and the other example of the configuration of the optical system in the optical scanning device 200 illustrated in FIGS. 8A and 8B. In FIGS. 2 to 9 and in FIGS. 10A to 12B, described later, reference numeral X represents the main scanning direction (longitudinal direction of the fθ lens 231), and reference numeral Y represents the directions orthogonal to both the main scanning direction X and the directions of the rotational axis (height direction H) of the deflection-scanning component 223, and the reference numeral H represents the directions of the rotational axis (height direction) of the deflection-scanning component 223.

In the optical scanning device 200, the size in the main scanning direction X1 of the reflective surface 223a of the deflection-scanning component 223 (second deflection-scanning component 2232) of the deflection-scanning unit 220 (2202) illustrated in FIGS. 7B, 8B and 9 is larger than the size in the main scanning direction X1 of the reflective surface 223a of the deflection-scanning component 223 (first deflection-scanning component 2231) of the deflection-scanning unit 220 (2201) illustrated in FIGS. 7A, 8A and 9. In the optical scanning device 200, by replacing the lower lids 204, 204 provided with the deflection-scanning unit 220 (2201, 2202) by means of a deflection-scanning unit 220 (2201) illustrated in FIGS. 7A, 8A and 9, and a deflection-scanning unit 220 (2202) illustrated in FIGS. 7B, 8B and 9, the deflection-scanning unit 220 (2201, 2202) can be exchanged. Hereinafter, the configurations illustrated in FIGS. 7A, 8A and 9 and the configurations illustrated in FIGS. 7B, 8B and 9 will be described together.

The optical scanning device 200 includes a housing 201, an incident optical system 210, a deflection-scanning unit 220 (deflection scanner), and an emission optical system 230.

The incident optical system 210 includes a light source 211 (laser diode element), a collimator lens 212, an aperture component 213, a cylindrical lens 214, and a light source reflecting mirror 215. The light source 211 emits a light beam L (laser beam). The collimator lens 212 exposes the aperture component 213 to the light beam L from the light source 211 as substantially parallel light. The aperture component 213 narrows the light beam L from the collimator lens 212 and exposes the cylindrical lens 214 to the light beam L. The cylindrical lens 214 causes the light beam L from the aperture component 213 to converge in only the sub-scanning direction and focuses the light beam L on a reflective surface 223a of the deflection-scanning component 223 (polygon mirror) via the light source reflecting mirror 215. The light source reflecting mirror 215 guides the light beam L from the cylindrical lens 214 to a reflective surface 223a of the deflection-scanning component 223 (polygon mirror).

The deflection-scanning unit 220 includes a deflection-scanning substrate 221, a deflection-scanning motor 222 (polygon motor), and a deflection-scanning component 223 (rotating many sided mirror (polygon mirror)). The deflection-scanning substrate 221 is attached to the flat surface (upper surface) side of the lower lid 204 by a plurality of attachment components (screws) SC. A deflection-scanning motor 222 is provided on the deflection-scanning substrate 221. A deflection-scanning component 223 (first deflection-scanning component 2231, second deflection-scanning component 2232) is attached to the rotating shaft 222a of the deflection-scanning motor 222 (first deflection-scanning motor 2221, second deflection-scanning motor 2222). The deflection-scanning component 223 deflection-scans the light beam L from the light source reflecting mirror 215 in a predetermined main scanning direction X1.

The emission optical system 230 includes an fθ lens 231, a beam-detector reflecting mirror 232, a beam detection lens 233 (focusing lens), and a beam detector 234 (beam detection sensor (BD sensor)).

The fθ lens 231 has a shape that is longest in the main scanning direction X1. The fθ lens 231 causes incidence of the light beam L that was deflection-scanned in the main scanning direction X1 (longitudinal direction W) by the deflection-scanning component 223. The beam-detector reflecting mirror 232 guides the light beam L deflection-scanned by a reflective surface 223a of the deflection-scanning component 223, to the beam detection lens 233.

Also, considering the detection accuracy of the beam detector 234, it is necessary to make the length of the first optical path from the deflection-scanning component 223 to the scanning object (photoreceptor drum 3) equal to or substantially equal to the length of the second optical path from the deflection-scanning component 223 to the beam detector 234, so as to make the beam diameter of the light beam L to which the photoreceptor drum 3 is exposed equal to or substantially equal to the beam diameter of the light beam L to which the beam detector 234 is exposed. However, in this example, the length of the first optical path is longer than the length of the second optical path. Therefore, the light beam L from the beam-detector reflecting mirror 232 is focused on the beam detector 234 by using the beam detection lens 233. As a result, even if the first optical path is longer than the second optical path length, the beam diameter of the light beam L in the photoreceptor drum 3 and the beam diameter of the light beam L in the beam detector 234 are made equal or substantially equal. The beam detection lens 233 can tolerate a certain degree of deviation of the optical axis of the light beam L.

In order to take the main scanning start time (image writing start time) of the light beam L, the beam detector 234 receives the light beam L at a time before the start of the main scan, and outputs a beam detection signal (BD signal) indicating the time before the start of the main scan. The beam detector 234 is an optical sensor (BD sensor) that acts as a synchronization detection element. In the present embodiment, synchronization signal (BD signal) obtained by detecting the output signal from the beam detector 234 is used to adjust the time of the scanning start position of image recording on the surface of the photoreceptor drum 3. The optical scanning device 200 further includes a substrate 240 (a substrate for detecting the light source and the beam detector). A light source 211 and a beam detector 234 are provided on the substrate 240.

The housing 201 has a bottom plate 201a with a rectangular shape and four side plates 201b to 201e surrounding the bottom plate 201a. The housing 201 is provided with a deflection-scanning chamber 203 (see FIGS. 4 to 6) that encloses the deflection-scanning unit 220. An opening 203a (see FIG. 6) is provided in in a portion of the bottom plate 201a, which corresponds to the deflection-scanning chamber 203. The opening 203a is closed by the lower lid 204. The lower lid 204 is attached to the bottom surface (lower surface) side of the bottom plate 201a by a plurality of attachment components (screws) SC. A deflection-scanning unit 220 is arranged on the lower lid 204, and the deflection-scanning unit 220 is housed in the deflection-scanning chamber 203 by attaching the lower lid 204 to the bottom plate 201a. As a result, the deflection-scanning unit 220 can be exchanged by replacing the lower lid 204 provided with a deflection-scanning unit 220, with a lower lid 204 provided with another deflection-scanning unit 220.

The light beam L reflected by the light source reflecting mirror 215 is incident on the inside of the deflection-scanning chamber 203 through the first window 203b (see FIG. 5) formed in the deflection-scanning chamber 203. Further, the light beam L scanned by the deflection-scanning component 223 is emitted to the outside of the deflection-scanning chamber 203 through the first window 203b. A first dustproof glass plate 235 (transparent body) is provided in the first window 203b. As a result, it is possible to effectively prevent unnecessary substances such as dust from entering into the deflection-scanning chamber 203. Further, the light beam L that has passed through the fθ lens 231 is emitted to the outside of the housing 201 through the second window 201f formed in the side plate 201e of the housing 201 on the side of the fθ lens 231. A second dustproof glass plate 236 (transparent body) is provided in the second window 201f. As a result, it is possible to effectively prevent unnecessary substances such as dust from entering into the housing 201.

The substrate 240 is a flat, plate shaped, printed substrate that has a circuit for driving the light source 211. The substrate 240 is attached to the outside of the side plate 201d on the side opposite to the fθ lens 231 of the housing 201 so that the emitting portion of the light source 211 and the light receiving portion of the beam detector 234 face inside the housing 201. The emitting portion of the light source 211 and the light receiving portion of the beam detector 234 face the inside of the housing 201 through respective openings (not illustrated) formed in the side plate 201d. As a result, the light source 211 can emit the light beam L from the emitting portion toward the collimator lens 212 in the housing 201. The beam detector 234 can receive the light beam L from the beam detection lens 233 in the housing 201 by using the light receiving portion.

Further, the deflection-scanning substrate 221 is a flat, plate-shaped printed substrate that has a circuit for driving the deflection-scanning motor 222. The deflection-scanning motor 222 is attached to the deflection-scanning substrate 221, and the central portion of the deflection-scanning component 223 is connected and attached to the rotating shaft 222a of the deflection-scanning motor 222. The deflection-scanning component 223 is rotationally driven by the deflection-scanning motor 222.

Next, the optical path of light beam L from the light source 211 until entering the photoreceptor drum 3 will be described.

The light beam L of the light source 211 is transmitted through the collimator lens 212, thus becoming substantially parallel light, is narrowed by the aperture component 213, is transmitted through the cylindrical lens 214, becomes incident on and then reflected by the light source reflecting mirror 215, and becomes incident on a reflective surface 223a of the deflection-scanning component 223. The deflection-scanning component 223 is rotated at a constant angular velocity in a predetermined rotation direction R by the deflection-scanning motor 222, reflects the light beam L sequentially on each reflective surface 223a, and repeatedly deflects the light beam L in the main scanning direction X1 at a constant angular velocity. The fθ lens 231 focuses the light beam L on the surface of the photoreceptor drum 3 so as to have a predetermined beam diameter in both the main scanning direction X1 and the sub-scanning direction. Further, the fθ lens 231 converts the light beam L, deflected in the main scanning direction X1 by the deflection-scanning component 223 at a constant angular velocity, so it moves at a constant linear velocity on the photoreceptor drum 3. As a result, the light beam L can repeatedly scan the surface of the photoreceptor drum 3 in the main scanning direction X1.

Further, the beam detector 234 causes the light beam L, reflected by the beam-detector reflecting mirror 232, to be incident immediately before the main scanning (writing) of the photoreceptor drum 3 is started. The beam detector 234 receives the light of the light beam L at the time immediately before the start of the main scanning of the surface of the photoreceptor drum 3, and outputs a BD signal indicating the time immediately before the start of the main scanning. The start time of the main scan of the photoreceptor drum 3, on which the toner image in formed, is set according to the BD signal, and the writing by the light beam L according to the image data is started. Then, the two-dimensional surface (peripheral surface) of the photoreceptor drum 3, which is rotationally driven and charged, is scanned by the light beam L, and each electrostatic latent image is formed on the surface of the photoreceptor drum 3.

Also, the closer the incident angle of the light beam L, incident on the first dustproof glass plate 235, is to a right angle, the more the light transmission can improve accordingly. In this regard, since the light beam L is scanned in the main scanning direction X1, for example, if the first dustproof glass plate 235 is provided along the longitudinal direction W of the fθ lens 231, the following inconveniences occur. That is, the light beam L (the light beam L directed from the deflection-scanning component 223 to the beam detector 234), outside of the scanning area α (see FIGS. 8A, 8B and 9), which is from the scanning start position to the scanning end position of the light beam L by the deflection-scanning component 223 on the first dustproof glass plate 235, is too far inclined with respect to the first dustproof glass plate 235, so the light transmission deteriorates.

In this respect, in the present embodiment, the first dustproof glass plate 235 is inclined so as to face the beam detector 234 with respect to the longitudinal direction W of the fθ lens 231. In this way, not only is it possible to avoid deterioration of the light transmission of the light beam L at the scanning area α with respect to the first dustproof glass plate 235, but it is also possible to avoid deterioration of light transmission of the light beam L from the deflection-scanning component 223 toward the beam detector 234 with respect to the first dustproof glass plate 235. Further, the deflection-scanning substrate 221 is arranged parallel to or substantially parallel to the first dustproof glass plate 235.

About the Present Embodiments

The optical scanning device 200 according to the present embodiment detects, by using the beam detector 234, the main scanning start time of the light beam L emitted from the light source 211 and deflection-scanned in the main scanning direction X1 by the deflection-scanning component 223.

Next, the first to fourth embodiments will be described below with reference to FIGS. 10A to 12B.

First Embodiment

Figure 10A:
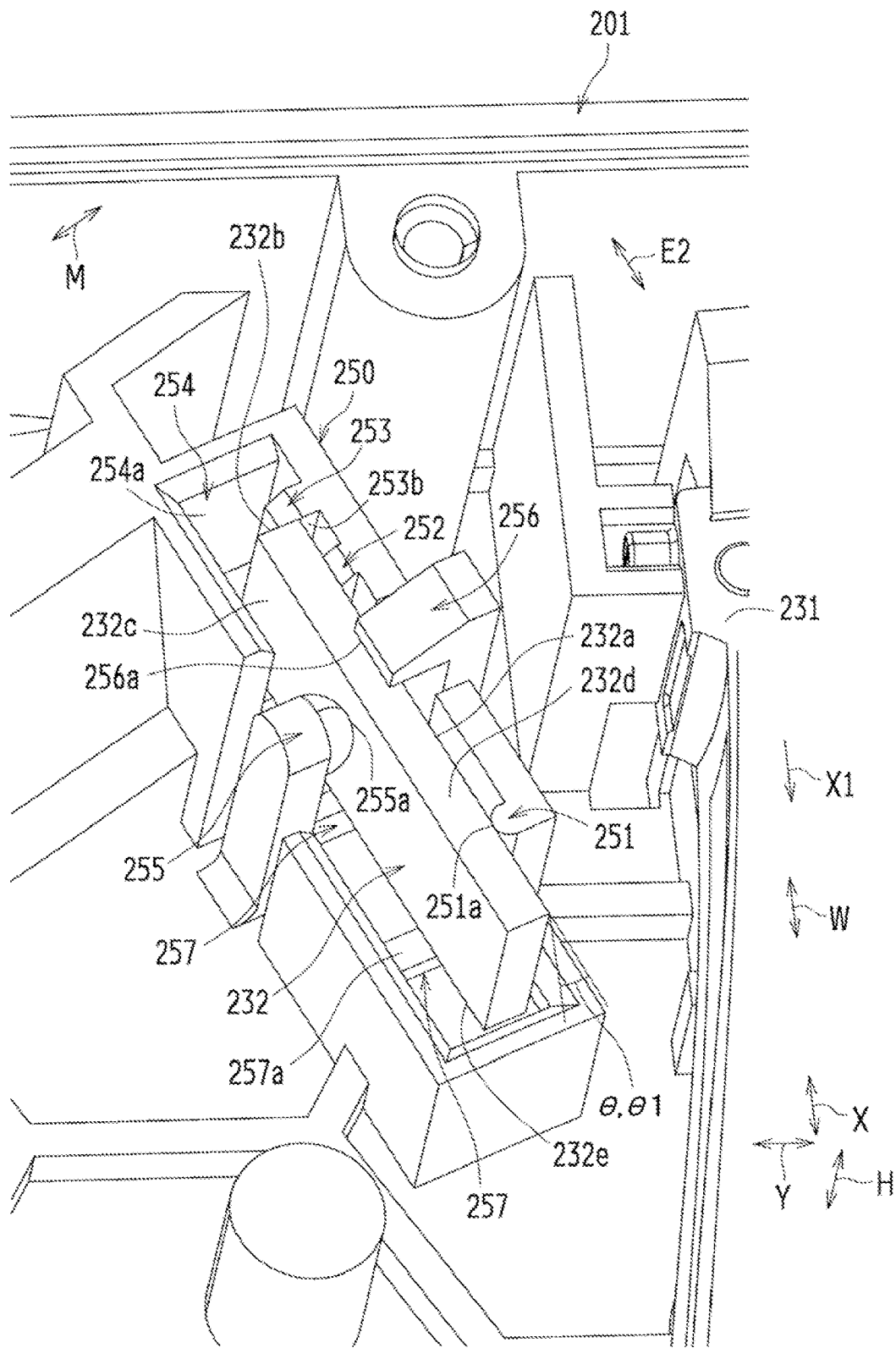
FIG. 10A is a perspective view illustrating a state in which a reflecting mirror is positioned in a first arrangement position and is supported by a support portion in a housing.
Figure 10B:
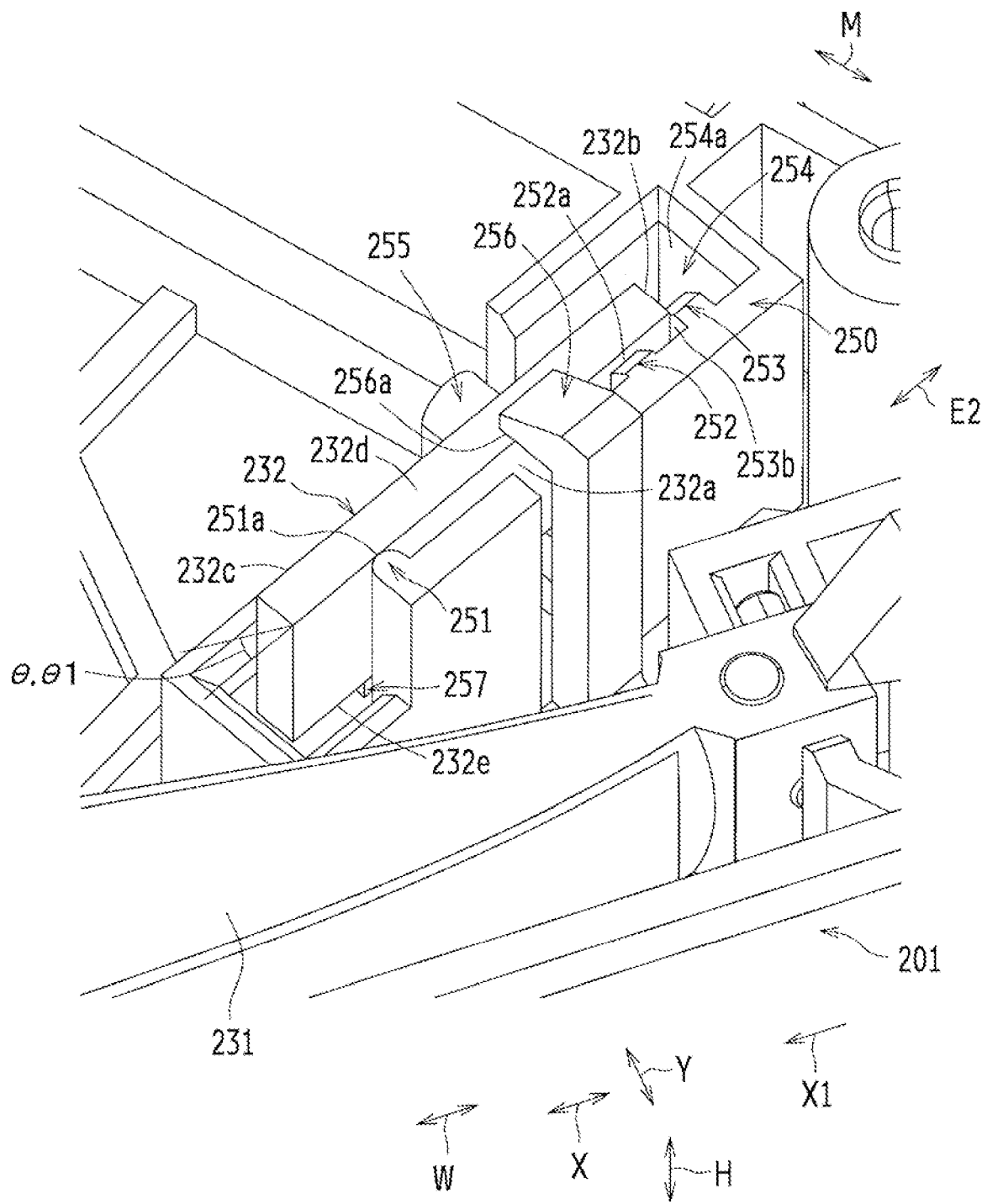
FIG. 10B is a perspective view illustrating a state in which a reflecting mirror is positioned in the first arrangement position and is supported by a support portion in the housing.
Figure 11A:
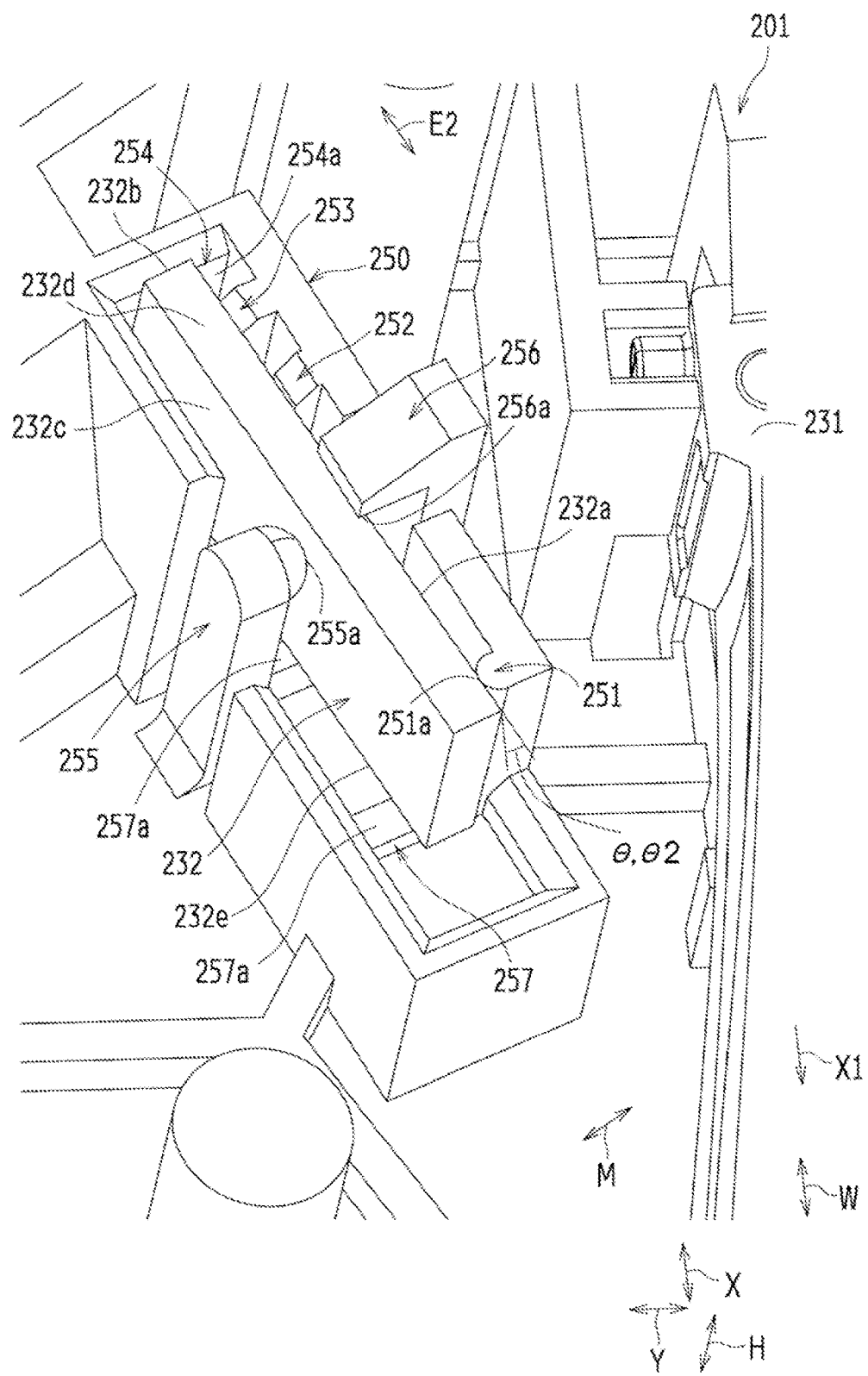
FIG. 11A is a perspective view illustrating a state in which a reflecting mirror is positioned in a second arrangement position and is supported by a support portion in the housing.
Figure 11B:
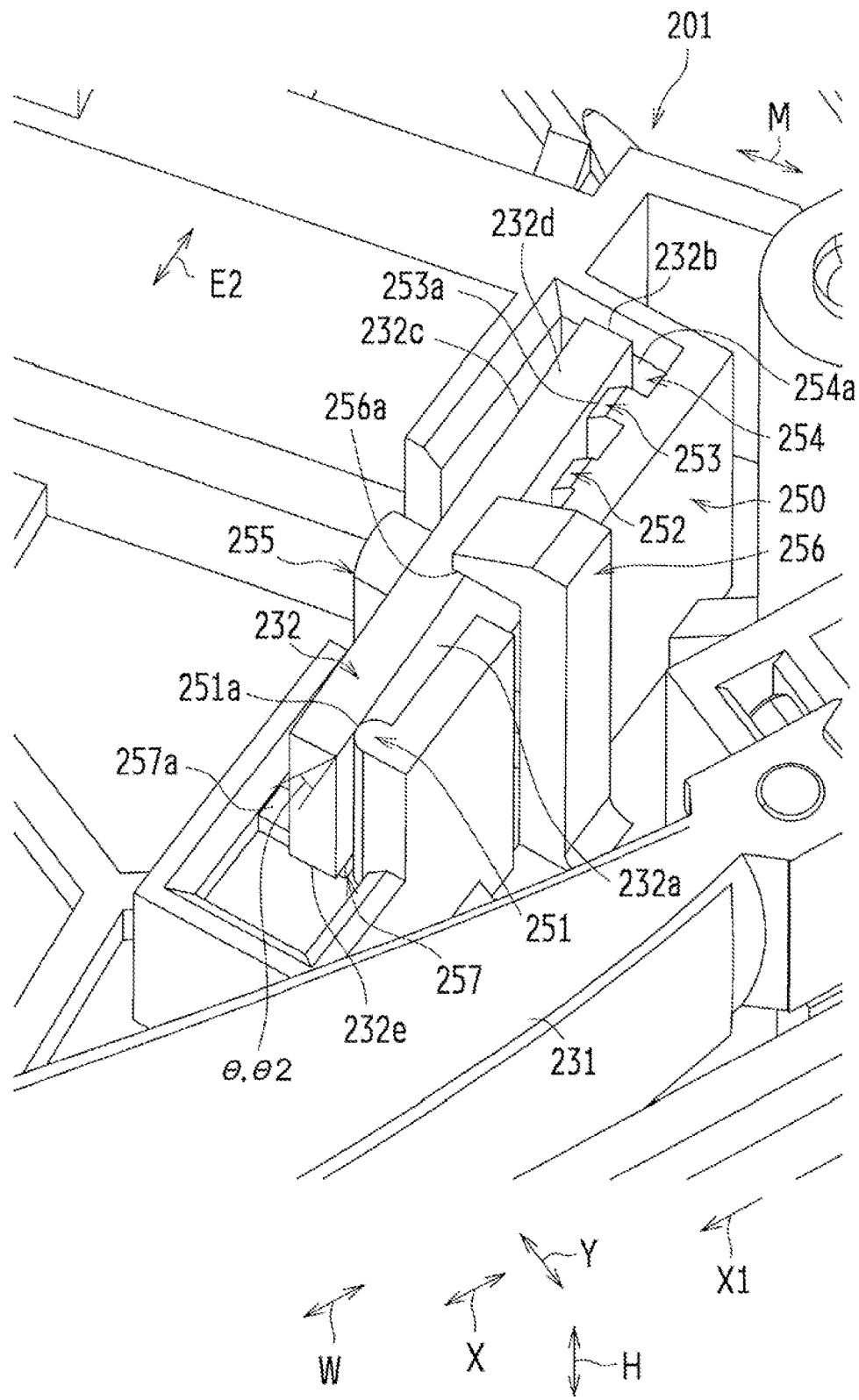
FIG. 11B is a perspective view illustrating a state in which a reflecting mirror is positioned in the second arrangement position and is supported by a support portion in the housing.
Figure 12A:
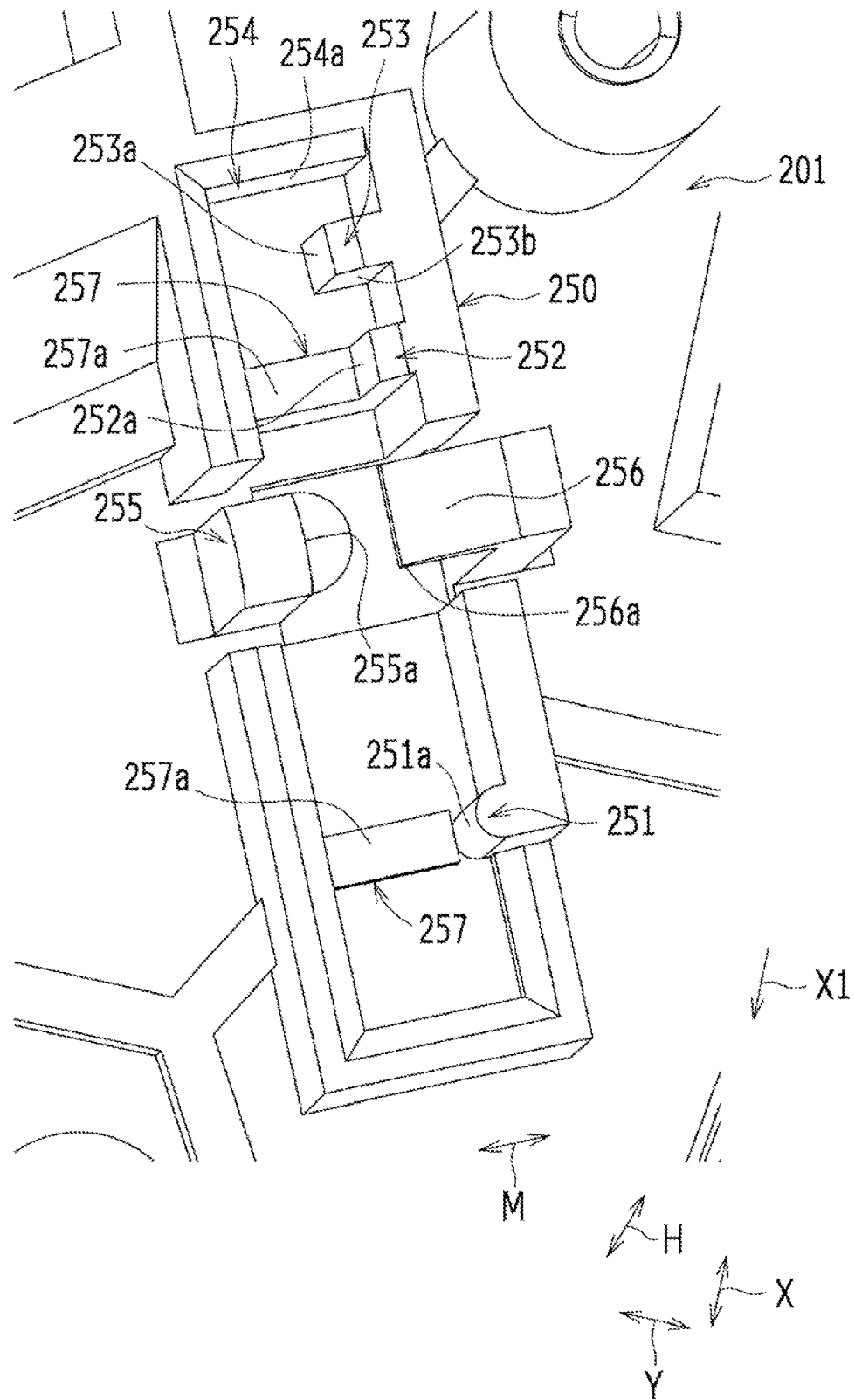
FIG. 12A is a perspective view illustrating a support portion in a housing from which the reflecting mirror has been removed.
Figure 12B:
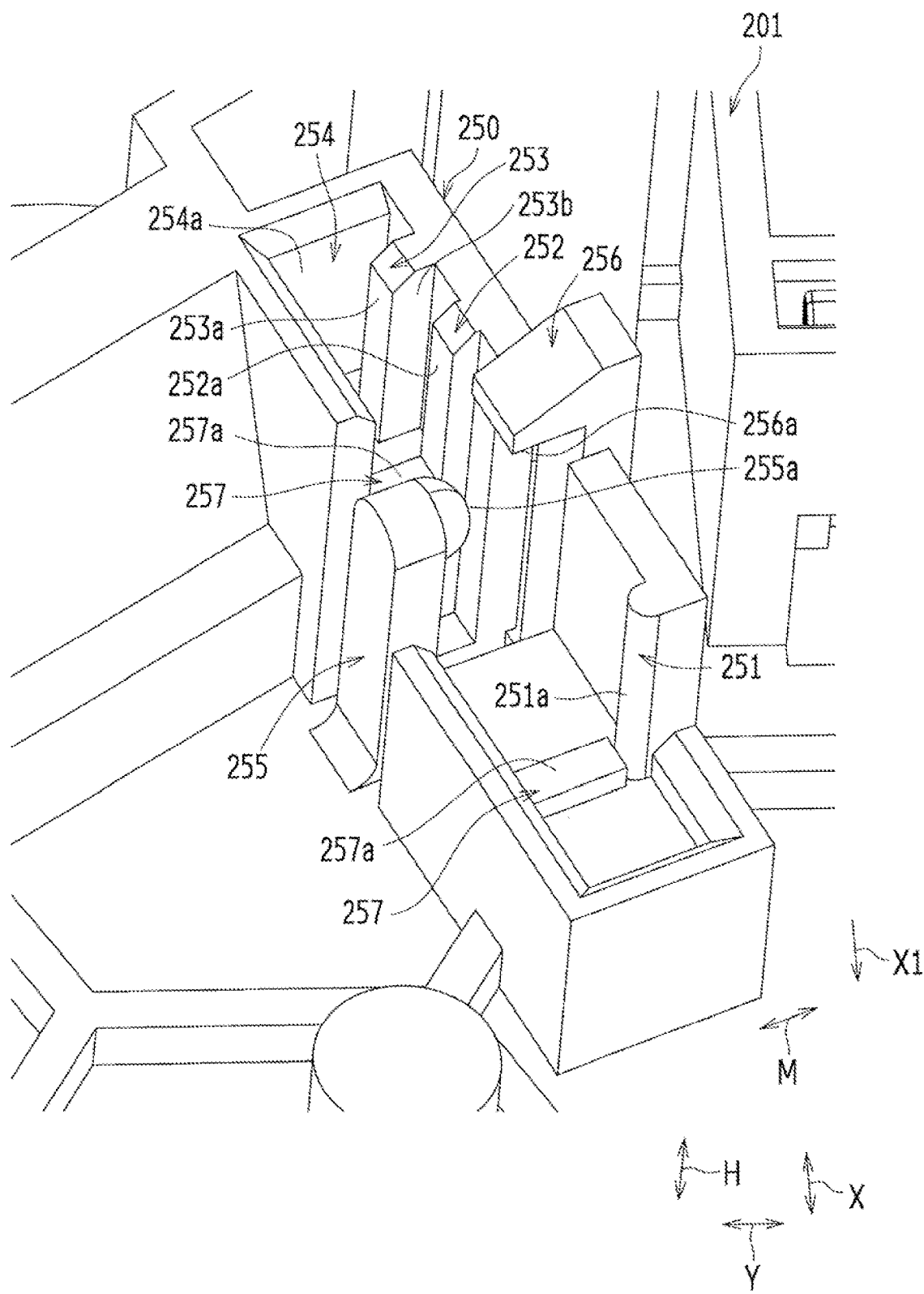
FIG. 12B is a perspective view illustrating a support portion in a housing from which the reflecting mirror has been removed.

FIGS. 10A and 10B are perspective views illustrating states in which the respective reflecting mirrors (232) are supported by the support portion 250 in the housing 201 in a state where the reflecting mirrors (232) are located in a first arrangement position. FIGS. 11A and 11B are perspective views showing a state in which the reflecting mirror (232) is supported by the support portion 250 in the housing 201 in a state where the reflecting mirrors (232) are positioned in a second arrangement position. FIGS. 12A and 12B are perspective views illustrating a support portion 250 in the housing 201 from which the reflecting mirror (232) has been removed.

The optical scanning device 200 according to the first embodiment includes a housing 201 provided with a support portion 250. The support portion 250 supports the reflecting mirror (232) that reflects the light beam L, at a plurality of different arrangement positions so the arrangement angles θ are different from each other.

The support portion 250 includes a first support portion 251, a second support portion 252, and a third support portion 253. The first support portion 251 commonly supports one first side surface 232a in the thickness direction M of the reflecting mirror (232), in a plurality of arrangement positions. Here, one first side surface 232a in the thickness direction M of the reflecting mirror (232) represents a surface opposite to the reflective surface that reflects the light beam L. The second support portion 252, together with the first support portion 251, supports the first side surface 232a of the reflecting mirror (232) in the first arrangement position (see FIGS. 10A and 10B) so the reflecting mirror (232) causes the first arrangement angle θ1. Further, the third support portion 253, together with the first support portion 251, supports the first side surface 232a of the reflecting mirror (232) in the other, second arrangement position (see FIGS. 11A and 11B) so the reflecting mirror (232) causes the other, second arrangement angle θ2. Here, the first arrangement angle θ1 and the second arrangement angle θ2 are the angles of the reflecting mirror (232) with respect to the reference line (the longitudinal direction W of the fθ lens 231 in the examples shown in FIGS. 10A and 10B). A gap is provided between the second support portion 252 and the reflecting mirror (232), positioned in the second arrangement position. That is, the second support portion 252 does not support the surface of the reflecting mirror (232) on the side opposite to the reflective surface that reflects the light beam L.

In this way, the reflecting mirror (232) that reflects the light beam L can be supported by the support portion 250 in a plurality of different arrangement positions so that the arrangement angles θ (θ1, θ2) are different from each other. As a result, the arrangement position of the reflecting mirror (232) (particularly the position in the main scanning direction X1) and the arrangement angles θ (θ1, θ2) can be changed. Therefore, a portion of the optical system components for deflection-scanning the light beam L can be commonly used in each model of the image forming apparatus.

The contact portion 252a of the second support portion 252 faces the first side surface 232a of the reflecting mirror (232) in the first arrangement position and comes into contact with the first side surface 232a. The contact portion 252a of the second support portion 252 has a planar shape. The contact portion 253a of the third support portion 253 faces the first side surface 232a of the reflecting mirror (232) in the second arrangement position and comes into contact with the first side surface 232a. The contact portion 253a of the third support portion 253 has a planar shape.

For example, if the optical scanning device 200 is to be commonly used by various models of image forming apparatuses having different sizes of scanning areas α (α1, α2) from the scanning start position to the scanning end position of the light beam L deflection-scanned by the deflection-scanning component 223, it is necessary to provide the optical scanning device 200 with a plurality of types of deflection-scanning components 223 having reflective surfaces 223a with sizes that are different from each other in the main scanning direction X1. In this case, from the viewpoint of decreasing the size of the housing 201, since the reflecting mirrors (232) are provided in the outside vicinity of the scanning areas α (α1, α2), the arrangement position of the reflecting mirror (232) is changed between the first scanning area α1 and the second scanning area α2. Then, since the angle of incidence of the light beam L on the reflecting mirror (232) changes, it is necessary to change the arrangement angles θ (θ1, θ2). In this example, the second scanning area α2 is larger than the first scanning area α1. Specifically, the first scanning area α1 is a scanning area for the first deflection-scanning component 2231, and the width (width of the image area) of the object to be scanned (photoreceptor drum 3) on the scanning surface is 310 mm. Further, the second scanning area α2 is a scanning area for the second deflection-scanning component 2232, and the width (width of the image area) of the object to be scanned (photoreceptor drum 3) on the scanning surface is 330 mm. Therefore, the reflecting mirror (232) in the second scanning area α2 is located on the outside of the arrangement position of the reflecting mirror (232) in the first scanning area α1. Then, the arrangement position and the arrangement angle θ of the reflecting mirror (232) change between the first scanning area α1 and the second scanning area α2.

In this regard, in the optical scanning device 200 according to the first embodiment, as the deflection-scanning component 223, a plurality of types of deflection-scanning components 223 can be exchanged, respectively having reflective surfaces 223a-223a with sizes that are different from each other in the main scanning direction X1. In this way, the optical scanning device 200 can be provided with a plurality of types of deflection-scanning components 223 respectively having reflective surfaces 223a-223a with sizes that are different from each other in the main scanning direction X1. In this example, the first deflection-scanning component 2231 illustrated in FIG. 7A has a reflective surface 223a with a predetermined first size in the main scanning direction X1. The second deflection-scanning component 2232 illustrated in FIG. 7B has a reflective surface 223a with a predetermined second size larger than the first size of the first deflection-scanning component 2231 illustrated in FIG. 7A in the main scanning direction X1.

If the length of the optical path from the light source 211 to the beam detector 234 is different to the extent exceeding a performance allowance level (particularly an allowance level of deviation of the optical axis) of an optical system component (particularly the beam detection lens 233) between the first arrangement position and the second arrangement position of the reflecting mirror (232), the positional relationship of the optical system members other than the reflecting mirror (232) must be changed or the performance of the optical scanning device 200 cannot be maintained.

In this respect, in the present embodiment, the reflecting mirror (232) is arranged so the length of the optical path from the light source 211 to the beam detector 234 is substantially the same between the first arrangement position and the second arrangement position of the reflecting mirror (232). Here, the length of the optical path from the light source 211 to the beam detector 234 being substantially the same means the range in which a performance allowance level (particularly an allowance level of deviation of the optical axis) of the optical system components (particularly the beam detection lens 233) is not exceeded. In this way, without changing the positional relationship of optical system components other than the reflecting mirror (232), it is possible for the optical scanning device 200 to be commonly used in each model of image forming apparatus while maintaining the performance of the optical scanning device 200.

In the optical scanning device 200 according to the first embodiment, the reflecting mirror (232) is a beam-detector reflecting mirror 232 that reflects the light beam L toward the beam detector 234. In this way, when the optical scanning device 200 is commonly used in each model of image forming apparatus, there is still compatibility if there are changes in the position of the optical path of the light beam L from the deflection-scanning component 223 (for example, the size of the scanning areas α (α1, α2)).

In the optical scanning device 200 according to the first embodiment, the reflecting mirror (232) arranged in the second arrangement position (see FIGS. 11A and 11B) is positioned to the outside of the reflecting mirror (232) which is arranged in the first arrangement position (see FIGS. 10A and 10B), in the main scanning direction X1. In this way, the optical scanning device 200 can be commonly used by each model of image forming apparatus even if the scanning areas α (α1, α2) become large.

In the optical scanning device 200 according to the first embodiment, the reflecting mirror (232) is provided between the deflection-scanning component 223 and the fθ lens 231 in a first orthogonal direction E1 that is orthogonal to both the main scanning direction X1 (longitudinal direction W of the fθ lens 231) and the direction of the rotational axis (height direction H) of the deflection-scanning component 223. In this way, the housing 201 can be decreased in size.

In the optical scanning device 200 according to the first embodiment, the first support portion 251 rotatably supports the reflecting mirror (232) between the first arrangement position and the second arrangement position, with a contact portion 251a of the reflecting mirror (232) as a fulcrum. In this way, the arrangement position and the arrangement angles θ (θ1, θ2) of the reflecting mirror (232) can be changed with a simple configuration. Specifically, the contact portion 251a of the reflecting mirror (232) of the first support portion 251 has a surface with a convex, curved shape extending in the height direction H. As a result, the first support portion 251 can be brought into contact with the first side surface 232a of the reflecting mirror (232), and therefore the reflecting mirror (232) can be smoothly rotated.

In the optical scanning device 200 according to the first embodiment, the third support portion 253 supports one second side surface 232b in a second orthogonal direction E2 orthogonal to both the thickness direction M and the height direction H of the reflecting mirror (232) in the first arrangement position (see FIGS. 10A and 10B). In this way, the reflecting mirror (232) in the first arrangement position can be reliably supported by the third support portion 253. The side surface 253b of the third support portion 253, toward the second support portion 252, faces the second side surface 232b of the reflecting mirror (232) and comes into contact with the second side surface 232b.

Second Embodiment

In the optical scanning device 200 according to the second embodiment, the support portion 250 further includes a fourth support portion 254. The fourth support portion 254 supports one second side surface 232b in the second orthogonal direction E2 orthogonal to both the thickness direction M and the height direction H of the reflecting mirror (232) in the second arrangement position (see FIGS. 11A and 11B). In this way, the reflecting mirror (232) in the second arrangement position can be reliably supported by the fourth support portion 254. The contact portion 254a of the fourth support portion 254 faces the second side surface 232b of the reflecting mirror (232) in the second arrangement position and comes into contact with the second side surface 232b. The contact portion 254a of the fourth support portion 254 has a planar shape.

In the optical scanning device 200 according to the second embodiment, the first support portion 251 supports one side (toward the inside) in the second orthogonal direction E2 orthogonal to both the thickness direction M and the height direction H of the first side surface 232a of the reflecting mirror (232). The second support portion 252 supports another side (toward the outside) of the first side surface 232a of the reflecting mirror (232) in the first arrangement position (see FIGS. 10A and 10B) in the second orthogonal direction E2. The third support portion 253 supports the first side surface 232a outside of the second support portion 252 in the second orthogonal direction E2 of the reflecting mirror (232) in the second arrangement position (see FIGS. 11A and 11B). In this way, the reflecting mirror (232) in the first arrangement position can be reliably supported by the first support portion 251 and the second support portion 252. Further, the reflecting mirror (232) in the second arrangement position can be reliably supported by the first support portion 251 and the third support portion 253.

Third Embodiment

In the optical scanning device 200 according to the third embodiment, the support portion 250 further includes a fifth support portion 255. The fifth support portion 255 supports another third side surface 232c, in the thickness direction M of the reflecting mirror (232), so that the reflecting mirror (232) in the first arrangement position and in the second arrangement position can be reliably supported by the fifth support portion 255. Specifically, the contact portion 255a of the fifth support portion 255 with the reflecting mirror (232) has a spherical shape. As a result, the fifth support portion 255 can be brought into point contact with the reflecting mirror (232), and therefore, the reflecting mirror (232) in the first arrangement position and in the second arrangement position can be reliably supported by the fifth support portion 255.

In the optical scanning device 200 according to the third embodiment, the fifth support portion 255 has elasticity in the thickness direction M of the reflecting mirror (232). The fifth support portion 255 presses against the third side surface 232c of the reflecting mirror (232). In this way, the reflecting mirror (232) in the first arrangement position and the second arrangement position can be more reliably sup-ported by the fifth support portion 255. Specifically, the fifth support portion 255 is formed of an elastic resin material.

Fourth Embodiment

In the optical scanning device 200 according to the fourth embodiment, the support portion 250 further includes a sixth support portion 256 and a seventh support portion 257. The sixth support portion 256 supports one fourth side surface 232d of the reflecting mirror (232) in the height direction H. The seventh support portion 257 supports another fifth side surface 232e of the reflecting mirror (232) in the height direction H. In this way, the movement of the reflecting mirror (232) in the height direction H in the first arrangement position and the second arrangement position can be regulated by the sixth support portion 256 and the seventh support portion 257. Specifically, the contact portions 256a and 257a of the reflecting mirror (232) of the sixth support portion 256 and the seventh support portion 257 with the fourth side surface 232d and the fifth side surface 232e have a planar shape. As a result, the sixth support portion 256 and the seventh support portion 257 can be brought into surface contact with the reflecting mirror (232), and therefore, the movement of the reflecting mirror (232) in the height direction H in the first arrangement position and the second arrangement position can be reliably regulated by the sixth support portion 256 and the seventh support portion 257. Specifically, the sixth support portion 256 and the seventh support portion 257 are ribs provided on the bottom surface of the housing 201. These ribs have the same height from the bottom surface of the housing 201.

Fifth Embodiment

In the optical scanning device 200 according to the fifth embodiment, the reflecting mirror (232) can be mounted to and dismounted from the housing 201. In this way, the workability of attaching the reflecting mirror (232) to the housing 201 can be improved, and the position of the reflecting mirror (232) can be easily changed between the first arrangement position and the second arrangement position.

The present invention is not limited to the embodiments described above, and can be implemented in various other forms. Therefore, the embodiments are merely examples in all respects and should not be interpreted to limit the present invention. The range of the present invention is shown by the range of claims and is not bound by the text of the specification. Further, all modifications and changes belonging to the equivalent range of the claims are within the range of the present invention.

DESCRIPTION OF REFERENCE NUMERALS

100 Image forming apparatus
200 Optical scanning device
201 Housing
202 Upper lid
203 Deflection-scanning chamber
203a Opening
204 Lower lid
210 Incident optical system
211 Light source
212 Collimator lens
213 Aperture component
214 Cylindrical lens
215 Light source reflecting mirror 220 Deflection-scanning unit
221 Deflection-scanning substrate
222 Deflection-scanning motor
222a Rotating shaft
223 Deflection-scanning component
2231 First deflection-scanning component
2232 Second deflection-scanning component
223a Reflective surface
230 Emission optical system
231 fθ lens
232 Beam-detector reflecting mirror (reflecting mirror)
232a First side surface
232c Third side surface
232d Fourth side surface
232e Fifth side surface
233 Beam detection lens
234 Beam detector
240 Substrate
250 Support portion
251 First support portion
252 Second support
253 Third support portion
254 Fourth support portion
255 Fifth support portion
256 Sixth support portion
257 Seventh support portion
3 Photoreceptor drum (object to be scanned)
E1 First orthogonal direction
E2 Second orthogonal direction
H Height direction
L Light beam
M Thickness direction
R Rotation direction
W Longitudinal direction
X1 Main scanning direction
α scanning area
α1 1st scanning area
α2 2nd scanning area
θ Arrangement angle
θ1 First arrangement angle
θ2 Second arrangement angle

What is claimed is:

1. An optical scanning device comprising:
a light source,
a beam detector that takes a main scanning start time of a light beam emitted from the light source and deflection-scanned in a predetermined main scanning direction by a deflection-scanning component, and
a housing provided with a support portion that supports a reflecting mirror reflecting the light beam in a plurality of different arrangement positions so arrangement angles are different from each other,
wherein the support portion includes:
a first support portion that commonly supports a first side surface in a thickness direction of the reflecting mirror in the plurality of arrangement positions;
a second support portion that supports the first side surface of the reflecting mirror together with the first support portion, causing a first arrangement angle in a first arrangement position of the reflecting mirror; and
a third support portion that supports the first side surface of the reflecting mirror together with the first support portion, causing a second arrangement angle in a second arrangement position of the reflecting mirror.

2. The optical scanning device according to claim 1, wherein as the deflection-scanning component, a plurality of types of deflection-scanning components can be exchanged, respectively having reflective surfaces with sizes that are different from each other in the main scanning direction.

3. The optical scanning device according to claim 1, wherein the reflecting mirror is arranged so a length of an optical path from the light source to the beam detector is substantially the same between the first arrangement position and the second arrangement position of the reflecting mirror.

4. The optical scanning device according to claim 1, wherein the reflecting mirror is a beam-detector reflecting mirror that reflects the light beam toward the beam detector.

5. The optical scanning device according to claim 4, wherein the reflecting mirror arranged in the second arrangement position is located on the outside of the reflecting mirror arranged in the first arrangement position, in the main scanning direction.

6. The optical scanning device according to claim 4, wherein the reflecting mirror is provided between the deflection-scanning component and an fθ lens in a first orthogonal direction orthogonal to both the main scanning direction and a direction of a rotational axis of the deflection-scanning component.

7. The optical scanning device according to claim 1, wherein the first support portion rotatably supports the reflecting mirror between the first arrangement position and the second arrangement position, with a contact portion of the reflecting mirror as a fulcrum.

8. The optical scanning device according to claim 1, wherein the third support portion supports a second side surface in a second orthogonal direction orthogonal to both the thickness direction of the reflecting mirror in the first arrangement position and a direction of a rotational axis of the deflection-scanning component.

9. The optical scanning device according to claim 1, wherein the support portion further includes a fourth support portion that supports a second side surface in a second orthogonal direction orthogonal to both the thickness direction of the reflecting mirror in the second arrangement position and a direction of a rotational axis of the deflection-scanning component.

10. The optical scanning device according to claim 1, wherein the first support portion supports a side of the first side surface in a second orthogonal direction orthogonal to both the thickness direction of the reflecting mirror and a direction of a rotational axis of the deflection-scanning component,
wherein the second support portion supports another side of the first side surface in the second orthogonal direction of the reflecting mirror in the first arrangement position, and
wherein the third support portion supports the first side surface outside of the second support portion in the second orthogonal direction of the reflecting mirror in the second arrangement position.

11. The optical scanning device according to claim 1, wherein the support portion further includes a fifth support portion that supports a third side surface in the thickness direction of the reflecting mirror.

12. The optical scanning device according to claim 11, wherein the fifth support portion has elasticity in the thickness direction of the reflecting mirror and presses against the third side surface of the reflecting mirror.

13. The optical scanning device according to claim 1, wherein the support portion further includes a sixth support portion that supports a fourth side surface of the reflecting mirror in the direction of a rotational axis of the deflection-scanning component, and a seventh support portion that supports a fifth side surface of the reflecting mirror in the direction of the rotational axis of the deflection-scanning component.

14. The optical scanning device according to claim 1, wherein the reflecting mirror is operable to be mounted to and dismounted from the housing.

15. An image forming apparatus comprising the optical scanning device according to claim 1.

* * * * *